July 26, 1932.   R. H. McMILLEN   1,869,208
COMPOSITE STEEL PLATE AND BAR
Filed Jan. 22, 1929
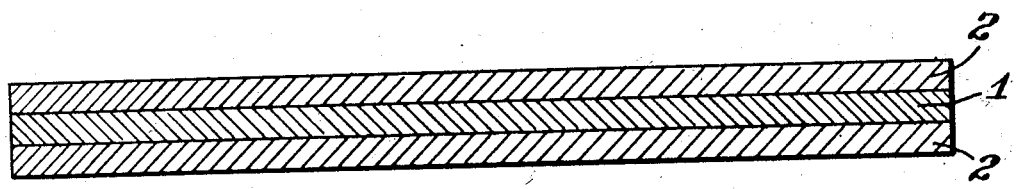
WITNESS
A B Wallace
INVENTOR
Russell H. McMillen
by Christy & Christy
his attorneys.

Patented July 26, 1932

1,869,208

UNITED STATES PATENT OFFICE

RUSSELL H. McMILLEN, OF PITTSBURGH, PENNSYLVANIA, ASSIGNOR TO CRUCIBLE STEEL COMPANY OF AMERICA, A CORPORATION OF NEW JERSEY

COMPOSITE STEEL PLATE AND BAR

Application filed January 22, 1929. Serial No. 334,307.

Composite steel plates are usually formed of an inner layer of low-carbon steel, to each of the opposite faces of which there is welded a layer of harder high-carbon steel, the plate thus having hard outer wearing surfaces, while the inner layer gives it toughness and some flexibility. These composite plates have a variety of uses, notably for ploughshares and moldboards.

In the manufacture of the composite plate there is first formed a bloom or billet of low-carbon steel, say two or three feet long, fifteen inches wide, and five inches thick. This low-carbon bloom is then secured centrally in an ingot mold fifteen inches square, and molten high-carbon steel is filled into the mold on the opposite sides of the bloom and is welded to the opposite faces of the low-carbon bloom, thus producing a composite ingot fifteen inches square in cross-section, which is subsequently rolled down to plate steel, for example, one-half an inch thick. It is a somewhat difficult operation to cast high-carbon steel in contact with the opposite faces of a solid bloom of low-carbon steel, and secure a composite ingot which can be successfully fabricated into a plate or bar having good sound welds between its several components. Therefore it has always been the practice in the manufacture of these composite plates, so far as I am aware, to insist that the center component shall not only be low in carbon, but low also in other elements which casually, but usually necessarily, enter into its composition, and notably so with respect to its manganese content, a very small percentage of the latter element, say less than 0.20 per cent., having been permitted.

In order to produce in the low-carbon center component of the finished plate the required refined grain structure, it is necessary to heat the whole plate to a temperature above the upper transformation point of the low-carbon component, and quench drastically, usually in a refrigerated saline medium. But the upper transformation point of the low-carbon component (about 1585° F.) is much higher than is that of the high-carbon components (about 1370° F.). Therefore in the requisite heat treatment of the composite plate the high-carbon layers are greatly overheated, and they often acquire a coarse-grained structure which is weak, brittle and altogether undesirable.

This difficulty may be overcome in a measure by giving the composite plate two heat treatments, namely, first heating to a temperature of about 1620° F. and quenching, and then heating again to a temperature of about 1420° F. and quenching. But this double operation is an expensive one, and further aggravates processing difficulties such as scaling and warping.

I have discovered that by including in the composition of the low-carbon layer of the plate a substantial percentage of manganese, and thereby lowering its upper transformation point, I can obtain a bloom or billet with which the molten high-carbon steel will make a good sound weld, and thus eventually produce a composite plate to which superior serviceable qualities can be given by a single heat treatment. This manganese content of the layer may range from about 0.50 per cent. to about two per cent., and the carbon content may range from about 0.25 per cent. down to a trace. For example, I have produced composite steel plates having a low-carbon layer of the following composition:

|  | Per cent |
|---|---|
| Carbon | .10 |
| Manganese | .75 |
| Silicon | .07 |
| Phosphorus | .03 |
| Sulphur | .03 |
| Iron | 99.02 |

The effect of the manganese content in this steel has been to give it an upper transformation point which is 100° or more below what that point would be in a steel otherwise the same but having only the low manganese content of steels heretofore used for this particular purpose. Consequently by heating a composite steel plate having a center layer of the composition above given to a temperature of 1500° F. and quenching in brine in the usual way, I have obtained in the center layer the desired refined grain, while the outer high-carbon layers have not been so highly heated as to have been affected injuriously. At the same time the welding of the several layers has been good and sound in all respects.

The carbon content of the high-carbon outer layers may vary according to the use to which the composite plate is to be put. In the case of ploughshares and moldboards it will run from one per cent. to 1.25 per cent.

It will be understood that the invention may be utilized in the manufacture of composite plates or bars of two or any number of layers in which are included individual layers greatly differing in their respective carbon contents, and consequently in their upper thermal transformation points. It will also be understood that in some cases the carbon content of the low-carbon component may be so low that under some definitions this component would be classified as iron rather than steel; but by the term "steel" in the appended claims I intend to include any such very low carbon product.

In the accompanying drawing there is illustrated, conventionally only, a cross-section of a composite plate embodying the present invention. The low-carbon inner layer is designated by the numeral 1, and the high-carbon outer layers are designated by the numerals 2.

I claim as my invention:

1. A heat-treated composite steel plate or bar, including two pieces of steel welded together face to face, one piece having a carbon content of less than 0.25 per cent, and containing from about 0.50 per cent. to about two per cent. of manganese, and the other piece having a carbon content of not less than 0.50 per cent.

2. A heat-treated composite steel plate comprising an inner low-carbon plate and two high-carbon plates having their respective inner faces welded to the opposite faces of said inner plate, said inner plate having a carbon content of less than 0.25 per cent. and containing from about 0.50 per cent. to about two per cent. of manganese, and said high-carbon plates each having a carbon content of not less than 0.50 per cent.

In testimony whereof I have hereunto set my hand.

RUSSELL H. McMILLEN.